United States Patent
Shin et al.

(10) Patent No.: US 9,652,086 B2
(45) Date of Patent: May 16, 2017

(54) TOUCH POINT RECOGNITION METHOD OF TOUCH SCREEN AND SYSTEM PERFORMING THE SAME

(71) Applicant: Hyundai Motor Company, Seoul (KR)

(72) Inventors: Dongsoo Shin, Suwon-si (KR); Sung Un Kim, Yongin-si (KR); Seona Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 181 days.

(21) Appl. No.: 14/144,282

(22) Filed: Dec. 30, 2013

(65) Prior Publication Data

US 2015/0029156 A1 Jan. 29, 2015

(30) Foreign Application Priority Data

Jul. 25, 2013 (KR) .......................... 10-2013-0088219

(51) Int. Cl.
*G06F 3/042* (2006.01)

(52) U.S. Cl.
CPC .................................. *G06F 3/0425* (2013.01)

(58) Field of Classification Search
CPC . G06F 3/041–3/0428; G06F 3/0488–3/04886; G06F 2203/04104; G06F 3/03547
See application file for complete search history.

(56) References Cited

U.S. PATENT DOCUMENTS

| | | | | |
|---|---|---|---|---|
| 6,323,846 B1* | 11/2001 | Westerman | ............ | G06F 3/0235 345/173 |
| 2007/0109274 A1* | 5/2007 | Reynolds | ................ | G06F 3/041 345/173 |
| 2009/0295756 A1* | 12/2009 | Shamaie | ............ | G06K 9/00355 345/175 |
| 2012/0182238 A1* | 7/2012 | Lee | ........................ | G06F 3/0418 345/173 |

FOREIGN PATENT DOCUMENTS

| | | |
|---|---|---|
| JP | 2012-073659 A | 4/2012 |
| JP | 2012-098987 A | 5/2012 |
| KR | 10-2012-0071230 A | 7/2012 |

* cited by examiner

*Primary Examiner* — Sanghyuk Park
(74) *Attorney, Agent, or Firm* — McDermott Will & Emery LLP (57) ABSTRACT

A touch point recognition method of a touch screen includes touching a palm on one surface of a screen and sensing a palm area from the other surface of the screen. Finger touch areas are extracted from the sensed palm area by using a bandpass filter, a finger area is extracted from the palm area by using an image processing filter, and a palm center area is extracted from the palm area by using a lowpass filter. The finger touch areas are grouped based on the finger area, and a finger touch area, which is distant from the center area in the group of the finger touch areas, is recognized as an actual touch area.

14 Claims, 9 Drawing Sheets

TOUCH POINT RECOGNITION METHOD OF TOUCH SCREEN AND SYSTEM PERFORMING THE SAME

CROSS-REFERENCE TO RELATED APPLICATION

This application claims the benefit of priority to Korean Patent Application No. 10-2013-0088219 filed in the Korean Intellectual Property Office on Jul. 25, 2013, the entire contents of which are incorporated herein by reference.

TECHNICAL FIELD

The present disclosure relates to a touch point recognition method of a touch screen that accurately senses finger point touch by sensing an actual area in the screen on which a palm is placed.

BACKGROUND

In general, as one operating principle of a touch screen, infrared rays are radiated using an infrared illumination, and irradiated infrared rays are irradiated to a rear surface of a screen. When a user touches a front surface of the screen with his/her hand, a part of the touched hand reflects the infrared rays.

A camera installed in a system senses such infrared rays reflected by the touched hand, and an image processing system calculates a touch point by sensing an image.

When the hand touches the screen by using the system, the reflected infrared rays become nonuniform, and a reflection area may be changed depending on a reflection dimension of the hand and proximity.

Accordingly, even though a finger point is generally recognized as a touch point, a finger knuckle is also recognized as the touch point for various reasons, and as a result, a touch screen system does not accurately recognize the actual touch point.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a touch point recognition method of a touch screen that improves an accuracy of a touch point by accurately sensing a finger point when a palm is placed on the touch screen.

According to an exemplary embodiment of the present disclosure, a touch point recognition method of a touch screen includes touching a palm on one surface of a screen and sensing a palm area from the other surface of the screen. Finger touch areas are extracted from the sensed palm area by using a bandpass filter, a finger area is extracted from the palm area by using an image processing filter, and a palm center area is extracted from the palm area by using a lowpass filter. The finger touch areas are grouped based on the finger area, and a finger touch area, which is distant from the center area in the group of the finger touch areas, is recognized as an actual touch area.

The method may further include recognizing a finger touch area, which is closer to a palm center point in the group of the finger touch areas, as a finger knuckle area.

The extracting of the palm center area may include setting a palm center point from the palm center area.

The recognizing of the finger touch area as the actual touch area may include recognizing an offset point, which is distant from an end point wherein the end point is the furthest point from the palm center point, as an actual touch point in the actual touch area by a set distance toward the center point.

The actual touch area may include the actual touch point.

The image processing filter may process a larger band than the bandpass filter.

According to another exemplary embodiment of the present disclosure, a touch point recognition system of a touch screen includes a screen of which one surface is touched with a palm, and a camera configured to sense an image on the other surface of the screen. An image processor is configured to process the image sensed by the camera and may perform the touch point recognition method of the touch screen.

The system may further include an infrared illumination configured to irradiate infrared rays onto the other surface of the screen.

The system may further include an infrared filter disposed in front of a camera lens.

The screen may be made of a material which the infrared rays are capable of penetrating.

According to exemplary embodiments of the present disclosure, in a touch point recognition method of a touch screen, a finger knuckle is excluded from a finger area of a palm area, an actual touch area of a finger that touches a screen is accurately sensed, and an actual touch point can be accurately recognized in the sensed actual touch area.

DETAILED DESCRIPTION OF THE EMBODIMENTS

An exemplary embodiment of the present disclosure will hereinafter be described in detail with reference to the accompanying drawings.

Figure 1:
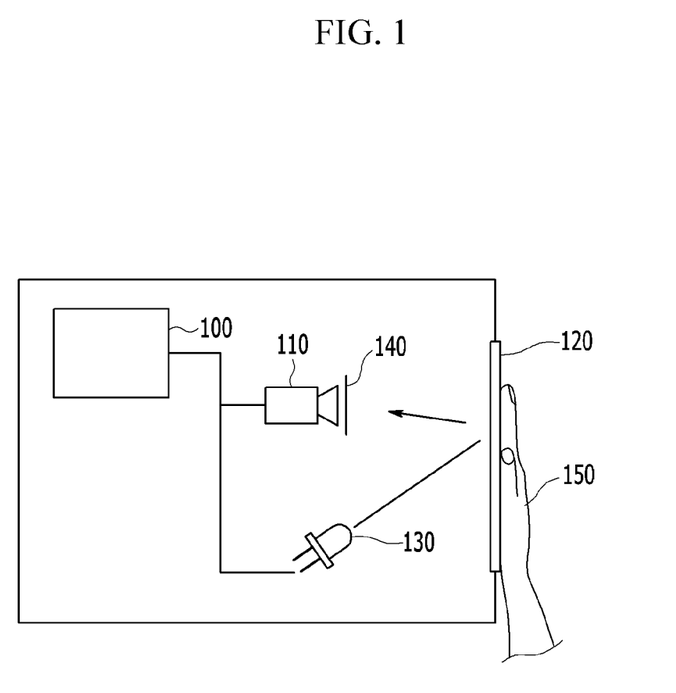
FIG. 1 is a schematic configuration diagram of a touch point recognition system of a touch screen according to an exemplary embodiment of the present disclosure.

FIG. 1 is a schematic configuration diagram of a touch point recognition system of a touch screen according to an exemplary embodiment of the present disclosure.

Referring to FIG. 1, a touch point recognition system of a touch screen includes an image processor 100, a camera 110, an infrared filter 140, an infrared illumination 130, and a screen 120, and a palm of a hand 150 of a user touches a front surface of the screen 120. In an exemplary embodiment of the present disclosure, the infrared filter 140 is disposed on a front surface of a camera 110 lens.

The infrared illumination 130 irradiates infrared rays onto a rear surface of the screen 120, and the camera 110 senses light reflected from the screen 120 and the palm through the screen 120. The image processor 100 then processes an image sensed by the camera 110 by applying a predetermined method.

Figure 2:
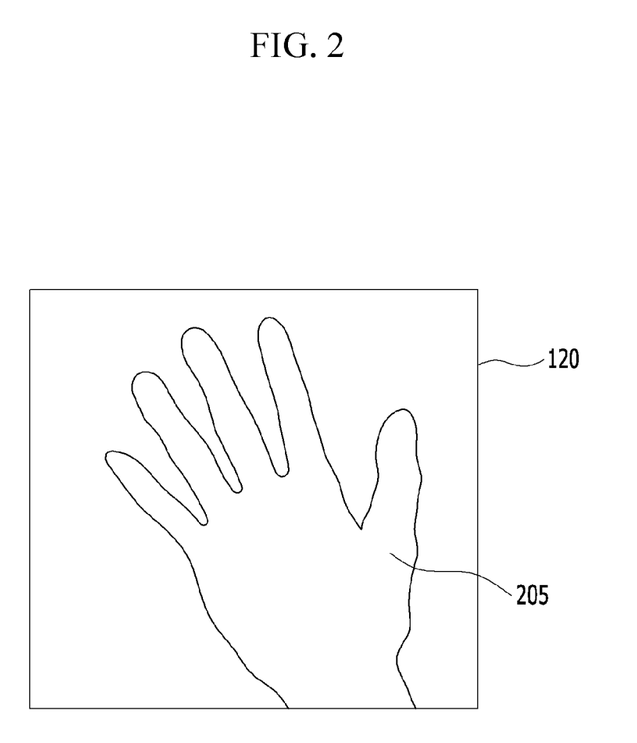
FIG. 2 illustrates a palm area in a touch point recognition method of a touch screen according to an exemplary embodiment of the present disclosure.

FIG. 2 illustrates a palm area in a touch point recognition method of a touch screen according to an exemplary embodiment of the present disclosure. FIG. 2 illustrates a screen in which the image processor 100 processes the image sensed by the camera 110, and a shape of a palm area 205 is shown on a screen 200.

Figure 3:
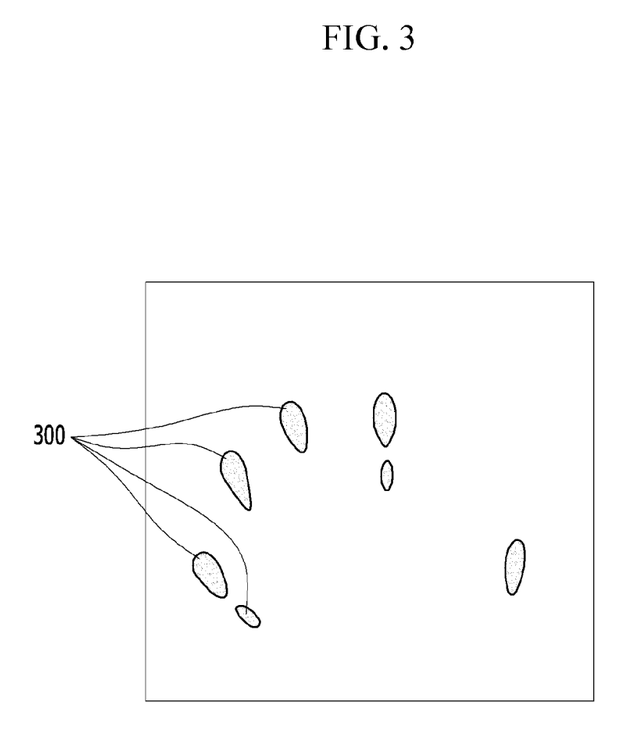
FIG. 3 illustrates finger touch areas in a touch point recognition method of a touch screen according to an exemplary embodiment of the present disclosure.

FIG. 3 illustrates finger touch areas in a touch point recognition method of a touch screen according to an exemplary embodiment of the present disclosure. Referring to FIG. 3, finger touch areas 300 are extracted from the palm area 205 of FIG. 2 by using a bandpass filter (not illustrated).

Figure 4:
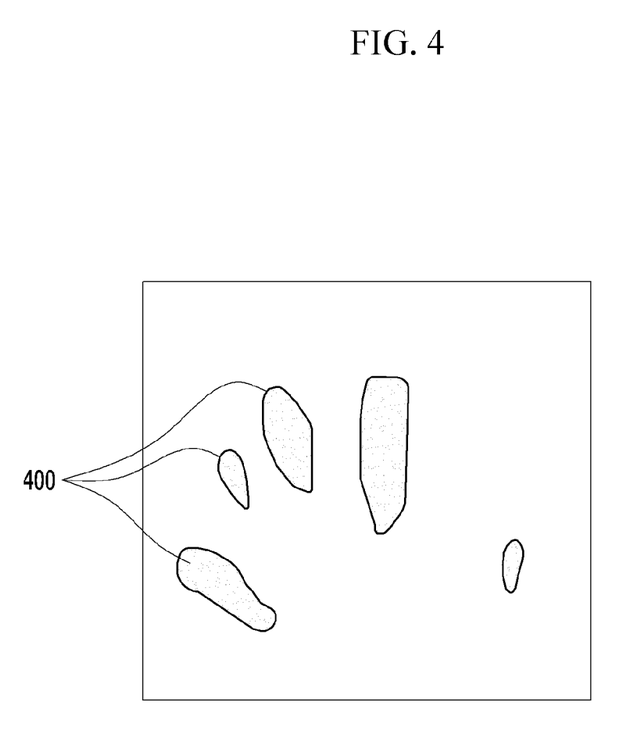
FIG. 4 illustrates finger areas in a touch point recognition method of a touch screen according to an exemplary embodiment of the present disclosure.

FIG. 4 illustrates finger areas in a touch point recognition method of a touch screen according to an exemplary embodiment of the present disclosure. Referring to FIG. 4, a finger area 400 is extracted from the palm area 205 of FIG. 3 by using an image processing filter (not illustrated) having a larger band than the bandpass filter.

Figure 5:
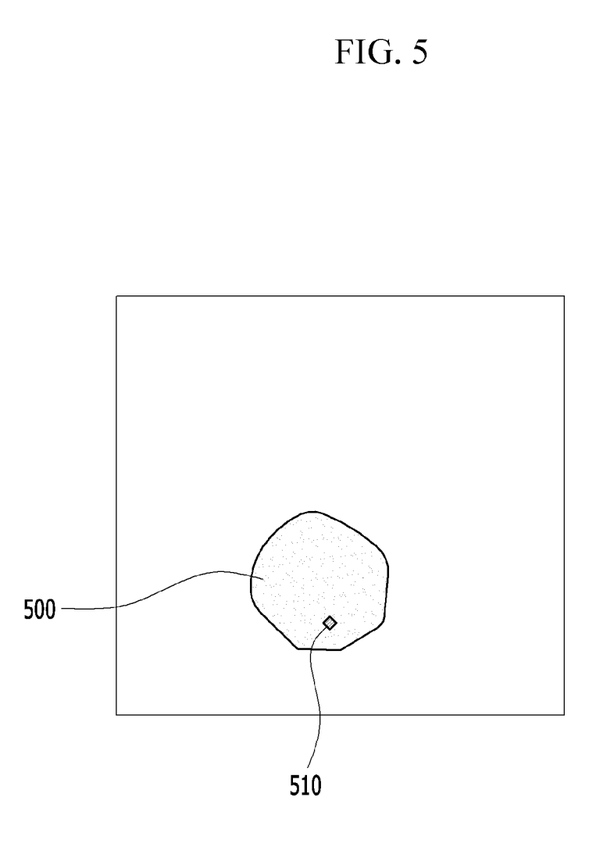
FIG. 5 illustrates a palm center area and a palm center point in a touch point recognition method of a touch screen according to an exemplary embodiment of the present disclosure.

FIG. 5 illustrates a palm center area and a palm center point in a touch point recognition method of a touch screen according to an exemplary embodiment of the present disclosure. Referring to FIG. 5, a palm center area 500 is extracted from the palm area 205 of FIG. 2 by using a lowpass filter (not illustrated), and a palm center point 501 is selected in the extracted palm center area 500. In an exemplary embodiment of the present disclosure, a description of a method for selecting the palm center point 510 in the palm center area 500 will be omitted.

Figure 6:
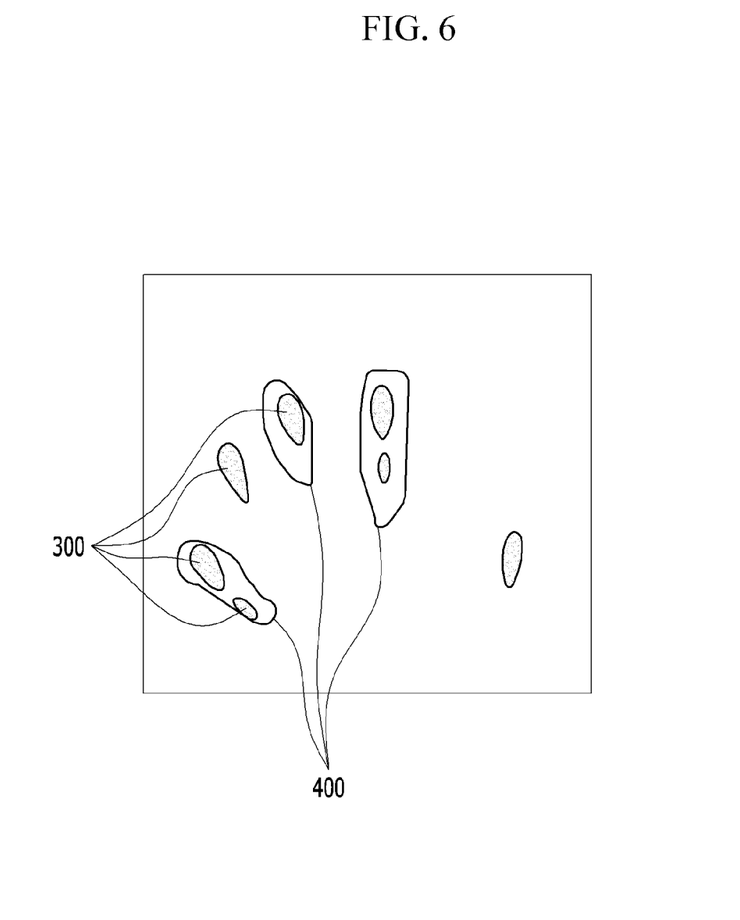
FIG. 6 illustrates finger touch areas and finger areas in a touch point recognition method of a touch screen according to an exemplary embodiment of the present disclosure.

FIG. 6 illustrates finger touch areas and finger areas in a touch point recognition method of a touch screen according to an exemplary embodiment of the present disclosure. Referring to FIG. 6, the finger touch areas 300 extracted in FIG. 3 are grouped based on the finger area 400 extracted in FIG. 4. That is, the finger touch areas 300 are inserted into the finger area 400 to be grouped.

Figure 7:
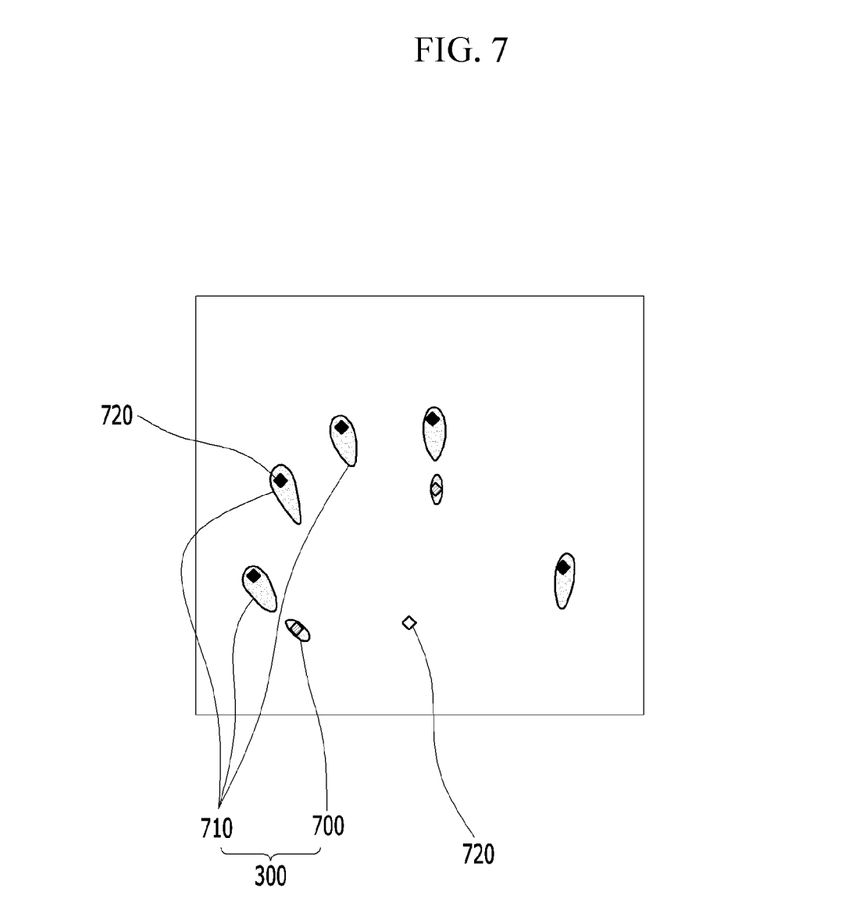
FIG. 7 illustrates an actual touch point in a touch point recognition method of a touch screen according to an exemplary embodiment of the present disclosure.

FIG. 7 illustrates an actual touch point in a touch point recognition method of a touch screen according to an exemplary embodiment of the present disclosure. Referring to FIGS. 6 and 7, a finger touch area, which is distant from the palm center point 510, among the finger touch areas 300 included in the finger area 400 is selected as an actual touch area 710. A finger touch area, which is closer to the palm center point 510 in the group of the finger touch areas, is recognized as a finger knuckle area 700. In addition, an actual touch point 720 is set in the actual touch area 710. A method for setting the actual touch point 720 in the actual touch area 710 will be described with reference to FIG. 8.

Figure 8:
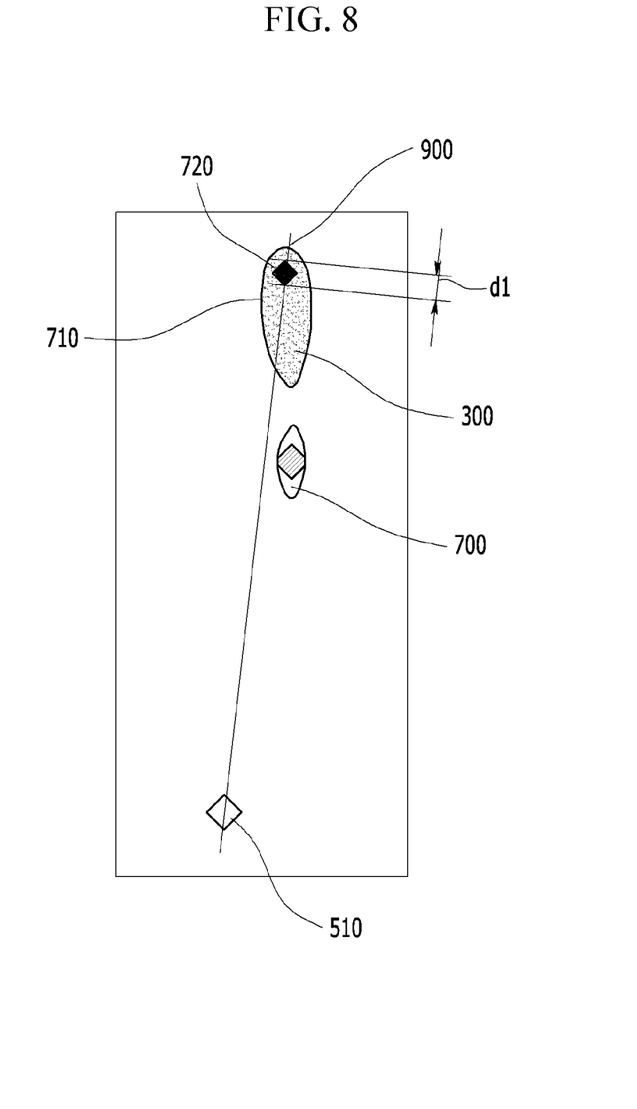
FIG. 8 illustrates a method for setting an actual touch point in a touch point recognition method of a touch screen according to an exemplary embodiment of the present disclosure.

FIG. 8 illustrates a method for setting an actual touch point in a touch point recognition method of a touch screen according to an exemplary embodiment of the present disclosure. As illustrated in FIG. 8, the touch screen for the method for setting the actual touch point includes the palm center point 510, the finger knuckle area 700, the actual touch area 710, and the actual touch point 720.

According to an exemplary embodiment of the present disclosure, the finger knuckle area 700 is not recognized as a touch point, and the actual touch point 720 disposed in the actual touch area 710 is recognized as an actual touch point.

The actual touch point 720 is distant from an end point 900 of the actual touch area 710 by an offset distance d1, which is set using the same method used to set the palm center point 510, and the actual touch point 720 is disposed in the actual touch area 710.

Figure 9:
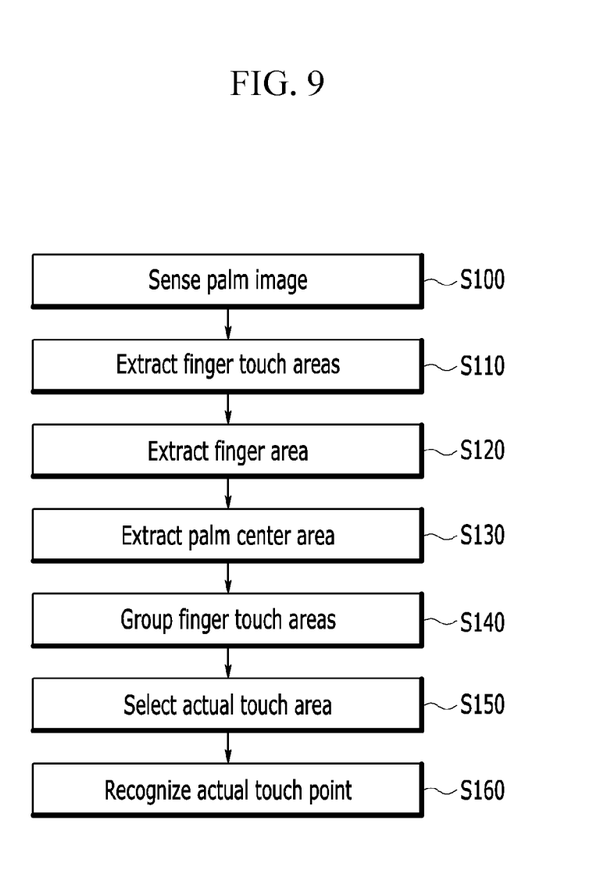
FIG. 9 is a flowchart illustrating a touch point recognition method of a touch screen according to an exemplary embodiment of the present disclosure.

FIG. 9 is a flowchart illustrating a touch point recognition method of a touch screen according to an exemplary embodiment of the present disclosure. Referring to FIG. 9, a touch point recognition method of a touch screen includes sensing the palm area 205, extracting the finger touch area 300, extracting the finger area 400, extracting the palm center area 500, grouping the finger touch areas 300, selecting the actual touch area 710, and recognizing the actual touch point 720.

In S100, the camera 110 senses the palm area 205 of a user through the screen 120, and in S110, the image processor 100 extracts the finger touch areas 300 from the palm area 205 by using a bandpass filter.

In S120, the finger area 400 is extracted from the finger touch areas 300 by using an image processing filter (not illustrated), and in S130, the palm center area 500 is extracted from the palm area 205 by using a lowpass filter (not illustrated).

In S140, the finger touch areas 300 are grouped based on the finger area 400, and in S150, the actual touch area 710 is selected from the group of the finger touch areas 300. In S160, the actual touch point 720 is recognized in the actual touch area 710.

In an exemplary embodiment of the present disclosure, the finger knuckle area 700 can be excluded from the finger area 400 of the palm area 205, the actual touch area 710 of the finger which contacts the screen 120 can be sensed, and the actual touch point 720 can be accurately recognized in the actual touch area 710.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A touch point recognition method of a touch screen, the method comprising:
    touching one surface of a touch screen with a hand and sensing a palm area of the hand by taking an optical image of the hand with a camera disposed at a side opposite to the hand with respect to the touch screen;
    extracting finger touch areas from the palm area sensed with the camera by using a bandpass filter;
    extracting finger areas from the palm area sensed with the camera by using an image processing filter;
    extracting a palm center area from the palm area sensed with the camera by using a lowpass filter;

grouping the finger touch areas according to where the finger touch areas are disposed among the finger areas; and recognizing a finger touch area, which is distant from the palm center area, in grouped finger touch areas as an actual touch area.

2. The touch point recognition method of claim 1, further comprising recognizing a finger touch area, which is closer to a palm center point in the grouped finger touch areas, as a finger knuckle area.

3. The touch point recognition method of claim 1, wherein the extracting of the palm center area includes setting a palm center point from the palm center area.

4. The touch point recognition method of claim 3, wherein the recognizing of the finger touch area as the actual touch area includes recognizing an offset point, which is distant from an end point, wherein the end point is a farthest point from the palm center point, as an actual touch point in the actual touch area by a set distance toward the palm center point.

5. The touch point recognition method of claim 4, wherein the actual touch point is included in the actual touch area.

6. The touch point recognition method of claim 1, wherein the mage processing filter processes a larger band than the bandpass filter.

7. A touch point recognition system of a touch screen, the system comprising:
a touch screen of which one surface is configured to sense a touch with a hand;
a camera disposed at a side opposite to the hand with respect to the touch screen and configured to take an optical image of a palm of the hand; and
an image processor configured to process the optical image taken by the camera,
wherein the image processor executes processes comprising:
sensing a palm area from the optical image taken by the camera;
extracting finger touch areas from the palm area by using a bandpass filter;
extracting finger areas from the palm area by using an image processing filter;
extracting a palm center area from the palm area by using a lowpass filter;
grouping the finger touch areas according to where the finger touch areas are disposed among the finger areas; and
recognizing a finger touch area, which is distant from the palm center area, in grouped finger touch areas as an actual touch area.

8. The touch point recognition system of claim 7, further comprising an infrared illumination disposed at the side opposite to the hand with respect to the touch screen and configured to irradiate infrared rays onto the touch screen.

9. The touch point recognition system of claim 8, further comprising an infrared filter disposed in front of a camera lens.

10. The touch point recognition system of claim 7, wherein the touch screen is made of a material which the infrared rays are capable of penetrating.

11. The touch point recognition system of claim 7, wherein the image processor further executes recognizing a finger touch area, which is closer to a palm center point in the grouped finger touch areas, as a finger knuckle area.

12. The touch point recognition system of claim 7, wherein the extracting of the palm center area includes setting a palm center point from the palm center area.

13. The touch point recognition system of claim 7, wherein the recognizing of the finger touch area as the actual touch area includes recognizing an offset point, which is distant from an end point, wherein the end point is a farthest point from the palm center point, as an actual touch point in the actual touch area by a set distance toward the palm center point.

14. The touch point recognition system of claim 13, wherein the actual touch point is included in the actual touch area.

* * * * *